United States Patent
Hoffner et al.

(10) Patent No.: US 9,485,712 B1
(45) Date of Patent: Nov. 1, 2016

(54) DATA BANDWIDTH OPTIMIZATION

(71) Applicant: Verizon Patent and Licensing Inc., Arlington, VA (US)

(72) Inventors: Barry F. Hoffner, Bridgewater, NJ (US); Lixia Yan, Basking Ridge, NJ (US); Ho Yin Cheuk, Hoboken, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/720,528

(22) Filed: May 22, 2015

(51) Int. Cl.
*H04W 48/06* (2009.01)
*H04W 52/02* (2009.01)
*H04W 8/08* (2009.01)
*H04W 24/02* (2009.01)
*H04W 8/20* (2009.01)

(52) U.S. Cl.
CPC ............ *H04W 48/06* (2013.01); *H04W 8/08* (2013.01); *H04W 24/02* (2013.01); *H04W 52/0212* (2013.01); *H04W 8/20* (2013.01)

(58) Field of Classification Search
CPC ..... H04W 48/06; H04W 8/08; H04W 24/02; H04W 52/0212; H04W 8/20; H04B 10/278; H04L 12/6418; H04L 43/026; H04L 47/12; H04L 12/26; H04L 12/28; H04L 12/2854; H04L 12/64; H04L 47/783
See application file for complete search history.

(56) References Cited

U.S. PATENT DOCUMENTS

| | | | |
|---|---|---|---|
| 8,971,841 B2 * | 3/2015 | Menezes ................ | H04W 4/26 455/405 |
| 9,219,825 B2 * | 12/2015 | Sheikh Naziruddin ....... | H04M 15/7652 |
| 9,220,066 B2 * | 12/2015 | Gerber .................... | H04L 67/26 |
| 2007/0275728 A1 * | 11/2007 | Lohr et al. ..................... | 455/450 |
| 2012/0129517 A1 * | 5/2012 | Fox et al. ..................... | 455/425 |
| 2012/0244852 A1 * | 9/2012 | Edge et al. ................ | 455/422.1 |
| 2012/0300629 A1 * | 11/2012 | Drucker ....................... | 370/235 |
| 2013/0012161 A1 * | 1/2013 | Rubin et al. ................ | 455/406 |
| 2015/0120957 A1 * | 4/2015 | Yun ..................... | H04L 65/4076 709/231 |
| 2015/0230207 A1 * | 8/2015 | Wang et al. ................. | 348/143 |

* cited by examiner

*Primary Examiner* — Hirdepal Singh

(57) ABSTRACT

Systems and methods for data bandwidth optimization are disclosed. A server receives, from a computing device, a request to begin a network data session. Responsive to receiving the request, the server allows the computing device to access network data at a full speed for a grace time period. Upon expiration of the grace time period, the server allows the computing device to access network data at a reduced speed for a monitoring time period. During the monitoring time period, the server monitors the computing device to determine whether the computing device is accessing network data in bursts or streaming data. Based on whether the computing device is accessing network data in bursts or streaming data, the server either allows the computing device to access network data at the full speed for a waiver time period or allows the computing device to access network data at the reduced speed until completion.

20 Claims, 5 Drawing Sheets

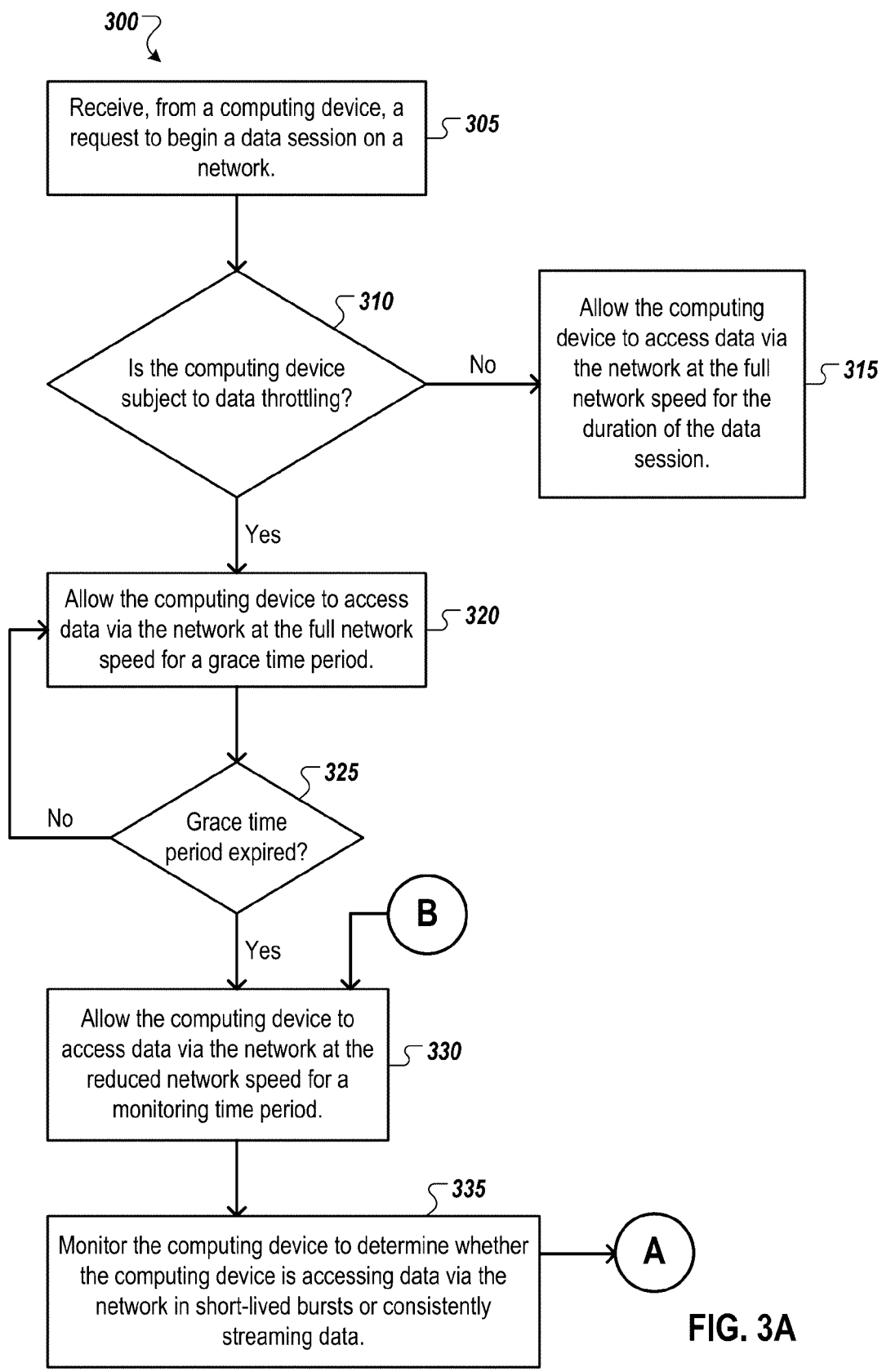

DATA BANDWIDTH OPTIMIZATION

BACKGROUND

A mobile network operator may provide its customers with access to data over a mobile network via radio access points. Some customers may purchase unlimited data plans and may use a lot of data, providing bottlenecks at the radio access points and reducing the quality of the experience of other customers. To discourage such high data use, the mobile network operator may throttle the data access of some customers, reducing their data speed. This may discourage customers from accessing a large amount of data.

However, one problem with the above scheme is that, when the customer's data speed is reduced, the customer has to spend more time to access the same amount of data (e.g., if the data speed is halved, the customer has to spend twice as much time). As a result, resources at the radio access point have to be provided to the customer for a longer time, and more power from the battery of the customer's computing device may be consumed. As the foregoing illustrates, a new approach for data throttling may be desirable.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 3A-3B illustrate an exemplary process for enforcing a data throttling policy;

DETAILED DESCRIPTION

Figure 1:
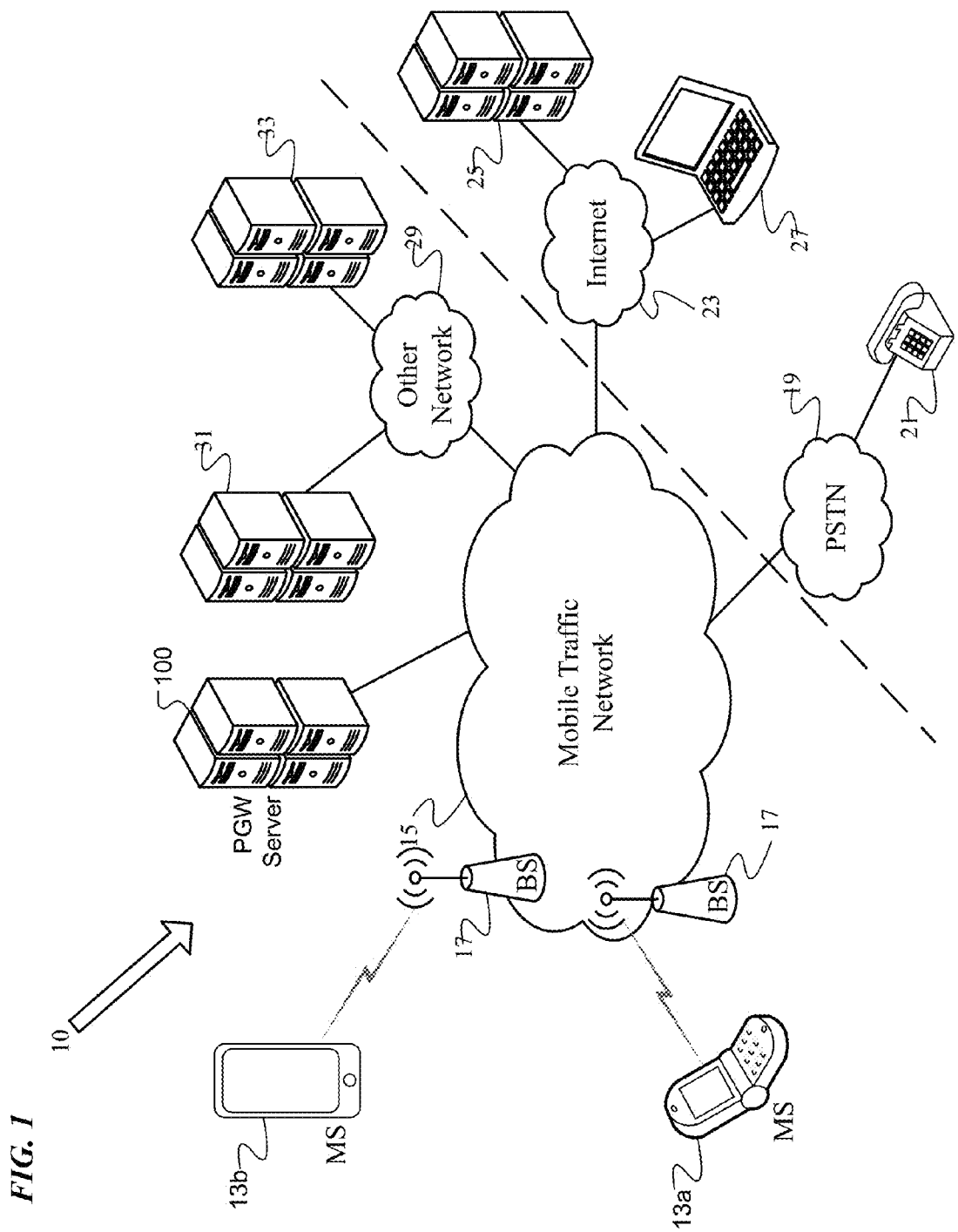
FIG. 1 is a high-level functional block diagram of an exemplary system of networks/devices that provide various communications for mobile stations.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

As set forth above, a mobile network operator that provides data access over its network may throttle the data access of some customers, for example, customers that access large amounts of data (e.g., more than 5 gigabytes per month) via an unlimited data plan. As a result of the throttling, the customer's data speed is reduced and more time is required to access the same amount of data. However, throttling may reduce the experience of the throttled customer because more battery power may be required to access the same amount of data. Also, throttling may reduce the experience of other customers as resources at the radio access point used by the throttled customer (and demanded by other customers in the same geographic location, who also wish to access data via the radio access point) have to be reserved by the customer for the longer time period required to access the same amount of data. As the foregoing illustrates, a new approach for data throttling may be desirable.

The subject technology provides a new approach for data throttling. Some components of the subject technology are implemented at a packet data network gateway (PGW) server of a mobile network operator. The PGW receives, from a computing device, such as a mobile phone, a tablet computer, a personal computer with a mobile network interface, etc., and via a radio access point, a request to begin a data session on a network. The PGW determines, for example, by consulting a billing server or a billing data repository of the mobile network operator, whether the computing device is subject to data throttling.

If the computing device is not subject to data throttling, the PGW allows the computing device to access the data network at the full network speed for the duration of the data session. For example, the PGW may inform the radio access point of this access grant or the radio access point may resort to such access grant as a default, in the absence of any instructions from the PGW. As used herein, the phrase "full network speed" may refer to a maximum speed allowed by a network, without any intentional slowing or delay of the network. For example, in a 4G or Long Term Evolution (LTE) network, full network speed may correspond to a download speed between 5 and 12 megabits per second (Mbps), and an upload speed between 2 and 5 Mbps. The phrase "full network speed" may also encompass its plain and ordinary meaning.

If the computing device is subject to data throttling, the PGW may allow the computing device to access data via the network at the full network speed for a grace time period (e.g., 1 second or 10 seconds). After expiration of the grace time period, the computing device may be allowed to access data via the network at a reduced network speed for a monitoring time period (e.g., 1 minute or 10 minutes). The PGW may provide, to the radio access point, instructions to allow the computing device to access data via the network at the reduced data speed. As used herein, the phrase "reduced network speed" may refer to a speed that is intentionally, by a machine on the network, such as the PGW or the radio access point, reduced to be slower than the full network speed. For example, in a 4G or LTE network, the "reduced network speed" may correspond to a download speed between 50 and 300 kilobits per second (kbps) and an upload speed between 10 and 50 kbps. The phrase "reduced network speed" may also encompass its plain and ordinary meaning. According to some examples, the full network speed exceeds 1 Mbps, and the reduced network speed is below 500 kbps.

During the monitoring time period, the PGW may monitor the computing device to determine whether the computing device is accessing data via the network in short-lived bursts (e.g., checking and downloading small emails once every threshold time period) or consistently streaming data (e.g., streaming a video from an online video service). After expiration of the monitoring time period, the PGW may determine, based on the monitoring, whether the computing device is accessing data via the network in short-lived bursts or consistently streaming data. Data accessed in short-lived bursts may be accessed automatically based on the programming of the computing device, and discouraging the user from accessing this data may be ineffective. However, streaming data, such as large online audio or video files played at the computing device, is typically accessed based on a manual user request, and such data accesses may be discouraged through slower data speeds.

Thus, if the computing device is consistently streaming data, the PGW may allow the computing device to access the data via the network at the reduced data speed until completion of the data session. However, if the computing device is accessing data via the network in short-lied bursts, the computing device may be allowed to access data via the network at the full network speed for a throttling waiver time period (e.g. 2 minutes or 5 minutes), until the short-lived bursts are likely to be completed. After the throttling waiver time period expires, the PGW may repeat the monitoring step with respect to the computing device, as described above.

Example durations for the grace time period, the monitoring time period, and the throttling waiver time period are set forth herein. However, other durations may be used. In some cases, the durations of one or more of these time periods may be set by a network engineer or a network administrator. The network engineer or network administrator may determine these durations based on one or more factors, such as a number of customers subject to throttling in a geographic area, a total number of customers in the geographic area, a number of radio access points in the geographic area, a time of day, a day of the week, a time of the year, local business requirements of the mobile network operator or the customers, etc.

Advantageously, as a result of the subject technology, a computing device that is subject to throttling has its data speeds slowed when it attempts to consistently stream data, but not when it is accessing data in short-lived bursts. Thus, the user experience is improved for throttled users, as throttled users can still access data that is automatically downloaded by their computing devices (e.g., email, software updates, weather or news alerts, etc.) at high speeds and low battery consumption rates. Also, the user experience is improved for other users, as the throttled users are discouraged from streaming data (due to lower data speeds during streaming), and, they do not cause congestion when they occupy radio access point resources for their automatically downloaded data, which is downloaded in short-lived bursts.

The subject technology serves to discourage throttled users from streaming data because data speeds are reduced during streaming. Oftentimes, streaming occurs due to voluntary activities of the user, such as playing an online video, listening to an online radio station or uploading a large file. At the same time, activities that are not due to the user's direct control, that occur in short-lived bursts, are not impacted. Examples of these activities may include the computing device automatically accessing a mail server to download email messages or automatically receiving a online instant message in an instant messaging service.

FIG. 1 illustrates an exemplary system 10 offering a variety of mobile communication services in a mobile network where data throttling may be implemented. The example of FIG. 1 shows two mobile stations (MSs) 13a and 13b as well as a mobile communication network 15. Each of the mobile stations 13a and 13b may correspond to a computing device, such as a mobile phone, a tablet computer, a laptop or desktop computer with a mobile network interface for the network 15, etc. The network 15 provides mobile wireless communications services to those stations as well as to other mobile stations (not shown), for example, via a number of base stations (BSs) 17. The present techniques may be implemented in or used in any of a variety of available mobile networks 15, and the drawing shows only a very simplified example of a few relevant elements of the network 15 for purposes of discussion here.

The wireless mobile communication network 15 might be implemented as a network conforming to the long term evolution (LTE) standard, the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard, the Universal Mobile Telecommunications System (UMTS) standard, the LTE standard belonging to 3GPP or other standards used for public mobile wireless communications. The mobile stations 13 may be capable of voice telephone communications through the network 15, and the mobile stations 13a and 13b may be capable of data communications through the particular type of network 15 (and the users thereof typically will have subscribed to data service through the network).

The network 15 allows users of the mobile stations such as 13a and 13b (and other mobile stations not shown) to initiate and receive telephone calls to each other as well as through the public switched telephone network or "PSTN" 19 and telephone stations 21 connected to the PSTN. The network 15 typically offers a variety of data services via the Internet 23, such as downloads, web browsing, email, etc. By way of example, the drawing shows a laptop PC type user terminal 27 as well as a server 25 connected to the Internet 23; and the data services for the mobile stations 13 via the Internet 23 may be with devices like those shown at 25 and 27 as well as with a variety of other types of devices or systems capable of data communications through various interconnected networks.

Mobile stations 13 can take the form of portable handsets, smart-phones or personal digital assistants, although they may be implemented in other form factors. Program applications can be configured to execute on many different types of mobile stations 13. For example, a mobile station application can be written to execute on a binary runtime environment for mobile (BREW-based) mobile station, a Windows Mobile based mobile station, Android, I-Phone, Java Mobile, or RIM based mobile station such as a BlackBerry or the like. Some of these types of devices can employ a multi-tasking operating system.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile stations 13, can include one or more RANs and a regional circuit and/or packet switched network and associated signaling network facilities.

Physical elements of a RAN operated by one of the mobile service providers or carriers, include a number of base stations represented in the example by the base stations (BSs) 17. The base stations may be eNodeB base stations, and may correspond to the radio access points described above. Although not separately shown, such a base station 17 can include a base transceiver system (BTS), which can communicate via an antennae system at the site of base station and over the airlink with one or more of the mobile stations 13, when the mobile stations are within range. Each base station can include a BTS coupled to several antennae mounted on a radio tower within a coverage area often referred to as a "cell." The BTS is the part of the radio network that sends and receives RF signals to/from the mobile stations 13 that are served by the base station 17.

The radio access networks can also include a traffic network represented generally by the cloud at 15, which carries the user communications and data for the mobile stations 13 between the base stations 17 and other elements with or through which the mobile stations communicate. The network can also include other elements that support functionality other than device-to-device media transfer services such as messaging service messages and voice communications. Some of the specific elements of the network 15 for carrying the voice and data traffic and for controlling various aspects of the calls or sessions through the network 15 are omitted here form simplicity. It will be understood that the various network elements can communicate with each other and other aspects of the mobile communications network 10 and other networks (e.g., the public switched telephone network (PSTN) and the Internet) either directly or indirectly.

As shown in FIG. 1, a PGW server 100 is connected to the mobile traffic network 15. The PGW server 100 controls access of mobile stations 13a and 13b to the mobile traffic network 15 by providing instructions to the base stations. For example, the PGW server 100 may enforce a data throttling policy, as discussed above. The operation of the PGW server 100 is described in greater detail below in conjunction with FIG. 2 and FIGS. 3A-3B. Specifically, the PGW server 100 may implement the process 300 described below.

The carrier may also operate a number of systems that provide ancillary functions in support of the communications services and/or application services provided through the network 10, and those elements communicate with other nodes or elements of the network 10 via one or more private IP type packet data networks 29 (sometimes referred to as an Intranet), i.e., a private networks. Generally, such systems are part of or connected for communication via the private network 29. A person skilled in the art, however, would recognize that systems outside of the private network could serve the same functions as well. Examples of such systems, in this case operated by the network service provider as part of the overall network 10, which communicate through the intranet type network 29, include one or more application servers 31 and a related authentication server 33 for the application service of server 31. As illustrated in FIG. 1, the servers 25 and 31 may communicate with one another over one or more networks. The application servers 31 may correspond to a billing server and may be coupled with a billing or customer records data repository, which indicates which of the mobile stations 13a and 13b are subject to data throttling.

A mobile station 13 communicates over the air with a base station 17. The mobile station 13 communicates through the traffic network 15 for various voice and data communications, e.g. through the Internet 23 with a server 25 and/or with application servers 31. Services offered by the mobile service carrier may be hosted on a carrier operated application server 31, for communication via the networks 15 and 29. Server such as 25 and 31 may provide any of a variety of common application or service functions in support of or in addition to an application program running on the mobile station 13. For a given service, an application program within the mobile station may be considered as a 'client' and the programming at 25 or 31 may be considered as the 'server' application for the particular service.

To insure that the application service offered by server 31 is available to only authorized devices/users, the provider of the application service also deploys an authentication server 33. The authentication server 33 could be a separate physical server as shown, or authentication server 33 could be implemented as another program module running on the same hardware platform as the server application 31. Essentially, when the server application (server 31 in our example) receives a service request from a client application on a mobile station 13, the server application provides appropriate information to the authentication server 33 to allow server application 33 to authenticate the mobile station 13 as outlined herein. Upon successful authentication, the server 33 informs the server application 31, which in turn provides access to the service via data communication through the various communication elements (e.g. 29, 15 and 17) of the network 10.

Figure 2:
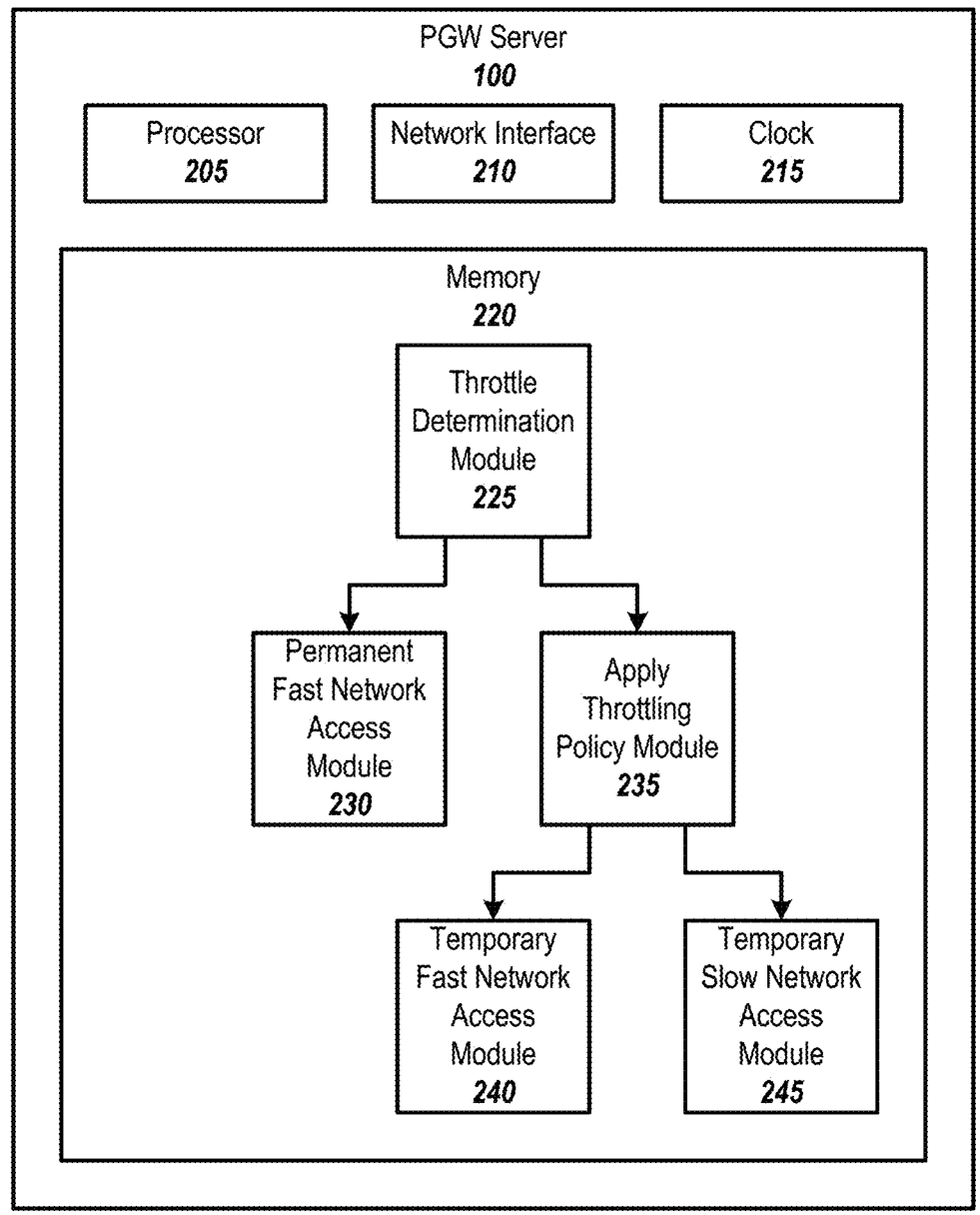
FIG. 2 illustrates an example of the packet data network gateway (PGW) server of FIG. 1.

FIG. 2 illustrates an example of the PGW server 100 of FIG. 1. As shown, the PGW server 100 includes a processor 205, a network interface 210, a clock 215, and a memory 220. The processor 205 executes instructions that are stored in a computer-readable medium, such as the memory 220. The network interface 210 allows the PGW server 100 to communicate via a network, such as the mobile traffic network 15 of FIG. 1, and to transmit and receive instructions from other machines on the network. The clock 215 allows the PGW server 100 to determine a current time or to measure differences in time. The memory 220 stores data or instructions. As shown, the memory 220 includes a throttle determination module 225, a permanent fast network access module 230, an apply throttling policy module 235, a temporary fast network access module 240, and a temporary slow network access module 245.

The throttle determination module 225, when executed by the processor 205, causes the processor 205 to communicate, through the network interface 210, with a billing server or billing records data repository, to determine whether a specific computing device (e.g., mobile station 13a or 13b) is subject to data throttling. If the computing device is not subject to throttling, the permanent fast network access module 230 is leveraged to allow the computing device to access the data network at the full data network speed. The permanent fast network access module 230 may provide instructions to radio access points (e.g., base stations 17) to allow the computing device to access the data network at the full network speed. However, if the computing device is subject to data throttling, the apply throttling policy module 235 is leveraged to apply a data throttling policy to the computing device.

The apply throttling policy module 235, when executed by the processor 205, causes the processor 205 to, upon initiation of a data session in the network (e.g., mobile traffic network 15) from the computing device, allow the computing device to access data via the network at the full network speed. For example, the computing device may be allowed to access data via the network through leveraging the temporary fast network access module 240 at the PGW server 100, for a grace time period. After the grace time period expires, the processor 205 allows the computing device to access data via the network at the reduced network speed, through leveraging the temporary slow network access module 245, for a monitoring time period. During the monitoring time period, the processor 205 monitors the computing device to determine whether the computing device is accessing data via the network in short-lived bursts or consistently streaming data. After expiration of the monitoring time period, if the computing device is consistently streaming data, the processor 205 leverages the temporary slow network access module 245 to allow the computing device to access data via the network at the reduced network speed until completion of the data session. As used herein, the term "consistently" may refer to throughout the associated time period, such as the monitoring time period. For example, the computing device may be consistently streaming data if the computing device is downloading or uploading data at every increment (e.g., 0.5 second increment, 1 second increment, 10 second increment, etc.) during the associated time period. The term "consistently" also encompasses its plain and ordinary meaning. Alternatively, if the computing device is accessing the data network in short-lived bursts (e.g., not consistently streaming data), the processor 205 leverages the temporary fast network access module 240 to allow the computing device to access data via the network at the full network speed for a throttling waiver time period. After expiration of the throttling waiver time period, the processor 205 returns to monitoring the computing device, while the computing device accesses the data network at the reduced network speed, as when the grace time period expired.

The temporary fast network access module 240, when executed by the processor 205, causes the processor 205 to transmit, via the network interface 210, an instruction to a radio access point to allow the computing device to access the data network at the full network speed for a specified time period (e.g., the grace time period or the throttle waiver time period). The temporary slow network access module 245, when executed by the processor 205, causes the processor 205 to transmit, via the network interface 210, an instruction to a radio access point to allow the computing device to access the data network at the reduced network speed for a specified time period (e.g., the monitoring time period). As will be appreciated, FIG. 2 illustrates one implementation of the PGW server 100 with one specific set of modules 225, 230, 235, 240, and 245. Other combinations of modules are possible.

Figure 3B:
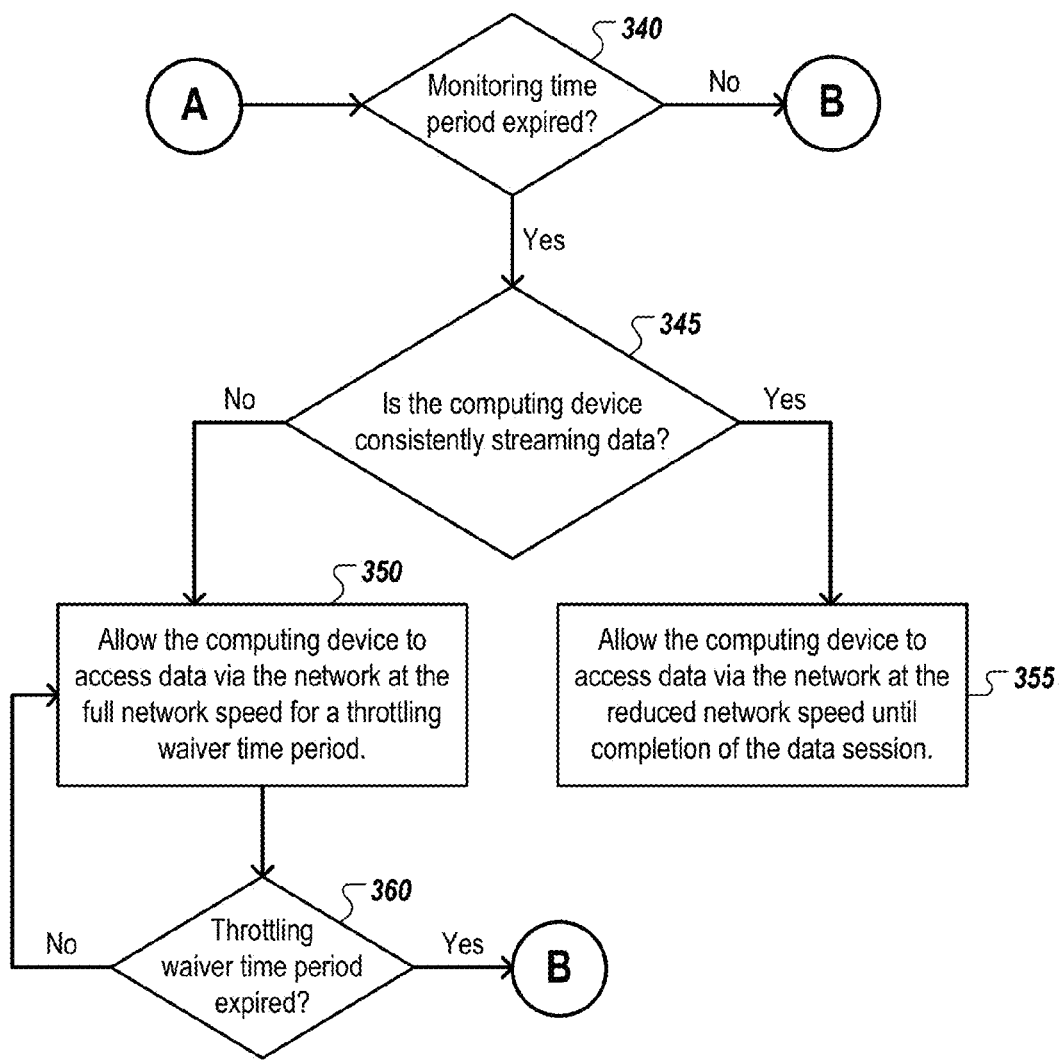

FIGS. 3A-3B illustrate an exemplary process 300 for enforcing a data throttling policy.

As shown in FIG. 3A, the process 300 begins at step 305, where a PGW server (e.g., PGW server 100) receives, from a computing device (e.g., mobile station 13a or 13b) a request to begin a data session on a network (e.g., mobile traffic network 15). For example, the computing device may open an application that accesses the network, such as a web browser, or the computing device may attempt to automatically download data (e.g., email messages, automatic software updates, news or weather alerts, etc.) from the network.

In step 310, the PGW server determines whether the computing device is subject to data throttling. For example, the PGW may be informed by a billing server, which accesses a billing or customer records database, whether the computing device is subject to data throttling. The billing server may determine whether the computing device is subject to data throttling based on an account associated with the computing device having accessed at least a threshold amount of data (e.g., 5 gigabytes or 10 gigabytes) within a current billing cycle, and based on the account associated with the computing device having an unlimited data plan. For example, the billing server may consult a policy charging rules function (PCRF) to determine whether the computing device is subject to data throttling. The PCRF may store a list (or other data structure) listing all computing devices or all accounts subject to data throttling. If the computing device is subject to data throttling, the process 300 continues to step 320. Otherwise, the process 300 continues to step 315.

In step 315, upon determining that the computing device is not subject to data throttling, the PGW server allows the computing device to access data via the network at the full network speed for the duration of the data session. For example, the PGW server may notify the radio access point that the computing device is to be granted data access at the full network speed. Alternatively, granting data access at the full network speed may be a default setting at the radio access point, and no notification from the PGW server may be needed. After step 315, the process 300 ends.

In step 320, upon determining that the computing device is subject to data throttling, the PGW server allows the computing device to access data via the network at the full network speed for a grace time period (e.g., 1 second or 10 seconds). As a result, if the computing device only needs to quickly access a small amount of data (e.g., to determine that there are no new email messages or to receive a message via a data-based instant messaging service) this may be handled quickly using the full network speed. In step 325, the PGW server determines whether the grace time period has expired. If the grace time period has not expired, the process 300 returns to step 320. If the grace time period has expired, the process 300 continues to step 330.

In step 330, the PGW server allows the computing device to access data via the network at the reduced network speed for a monitoring time period (e.g., 1 minute or 10 minutes). For example, the PGW server may notify the radio access point that the computing device is to be granted network data access at the reduced network speed for the monitoring time period, and the radio access point may process the notification and provide network data access to the computing device accordingly.

In step 335, the PGW server monitors, during the monitoring time period, the computing device to determine whether the computing device is accessing the data via the network in short-lived bursts or consistently streaming data. For example, the PGW server may determine, during the monitoring time period, a data drop rate (e.g., access point name—aggregate maximum bit rate (APN-AMBR)) of the computing device. If the data drop rate is above a data drop threshold, the PGW server determines that the computing device is consistently streaming data. If the data drop rate is below the data drop threshold, the PGW server determines that the computing device is accessing data in short-lived bursts.

The PGW server may determine the data drop rate by splitting the monitoring time period into multiple time increments (e.g., 10 time increments or 100 time increments), each time increment having a predetermined duration (e.g., 10% or 1% of the duration of the monitoring time period). The PGW server may determine an amount of data dropped in each time increment within the multiple time increments. The PGW server computes an average amount of data dropped per time increment, for example, by dividing the total amount of data dropped by the number of time increments. The PGW server then determines the data drop rate based on the computed average amount of data dropped per time increment. After step 335, the process 300 continues to step 340 of FIG. 3B.

As shown in FIG. 3B, in step 340, if the monitoring time period has not expired, the process 300 returns to step 330 of FIG. 3A. However, if the monitoring time period has expired, the process 300 continues to step 345.

In step 345, after the monitoring time period has expired, the PGW server determines whether the computing device is accessing the data via the network in short-lived bursts or consistently streaming data based on the information obtained during the monitoring time period of steps 330 and 335. If the computing device is accessing the data via the network in short-lived bursts, the process 300 continues to step 350. If the computing device is consistently streaming data, the process 300 continues to step 355.

In step 355, upon determining that the computing device is consistently streaming data, the PGW server allows the computing device to access data via the network at the reduced speed until completion of the data session. For example, the PGW server may notify the radio access point that the computing device is to be granted network access at the reduced network speed until completion of the data session and the radio access point may process the notification. After step 355, the process 300 ends.

In step 350, upon determining that the computing device is accessing the data via the network in short-lived bursts, the PGW server allows the computing device to access data via the network at the full network speed for a throttling waiver time period. For example, the PGW server may instruct the radio access point that the computing device is to be granted network access at the full network speed for the throttling waiver time period and the radio access point may process the notification. After step 350, the process 300 continues to step 360, where the PGW server determines whether the throttling waiver time period has expired. If not, the process 300 returns to step 350. If the throttling waiver time period has expired, the process 300 returns to step 330 of FIG. 3A. The process 300 may cycle through the steps 330-360 multiple times.

As illustrated in FIGS. 3A-3B, the steps of the process 300 are implemented in series and in a specified order. However, the steps of the process 300 may be implemented in any order. In some examples, two or more of the steps of the process 300 may be implemented in parallel.

As discussed above, the grace time period, monitoring time period, and throttling waiver time period may be set by an administrator based on some factors, such as a number of customers subject to throttling in a geographic area, a total number of customers in the geographic area, a number of radio access points in the geographic area, a time of day, a day of the week, a time of the year, local business requirements of the mobile network operator or the customers, etc. In addition or in place of the above, the grace time period, monitoring time period or throttling waiver time period may be adjusted based on other variables. The other variables may be optimized for reducing radio resource consumption (at the radio access point, such as the base station 17) during data throttling.

The other variables may include a traffic type detected at the PGW server (e.g., PGW server 100). The traffic type may be a data traffic type, such as transmission control protocol (TCP), user datagram protocol (UDP), file transfer protocol (FTP), real-time transfer protocol (RTP), RTP control protocol (RTCP), hypertext transfer protocol (HTTP) or HTTP secure (HTTPS). The traffic type may be used as the determination of the traffic pattern to shape the data throttling techniques described herein. For instance, downlink UDP traffic may be throttled without impact to the radio resources at the radio access point. The traffic type may be application data. Application data may include videos, photographs, messages, etc. The type of application data may be used to determine whether data is being accessed in short-lived bursts (e.g., text messages transmitted over the data network) or streamed (e.g., an online video being played at the computing device).

The other variables may include TCP window size detection. After detecting the TCP window size, further optimization may be done to optimize radio resource use at the radio access point. For example, if the TCP window size is smaller than the pre-defined limit, the data throttling function may be suspended. The other variables may include data mix prioritization. For users subject to data throttling, some data traffic may be prioritized over other data traffic. For example, business email traffic may be prioritized over social networking traffic. A message sent through the data network that originated at a hospital may be prioritized over a message sent through the data network that originated at a supermarket.

As shown by the above discussion, functions relating to voice and data communication may be implemented on computers connected for data communication via the components of a packet data network, as shown in FIG. 1. Although special purpose devices may be used, such devices also may be implemented using one or more hardware platforms intended to represent a general class of data processing device commonly used to run "server" programming so as to implement the functions discussed above, albeit with an appropriate network connection for data communication.

Figure 4:
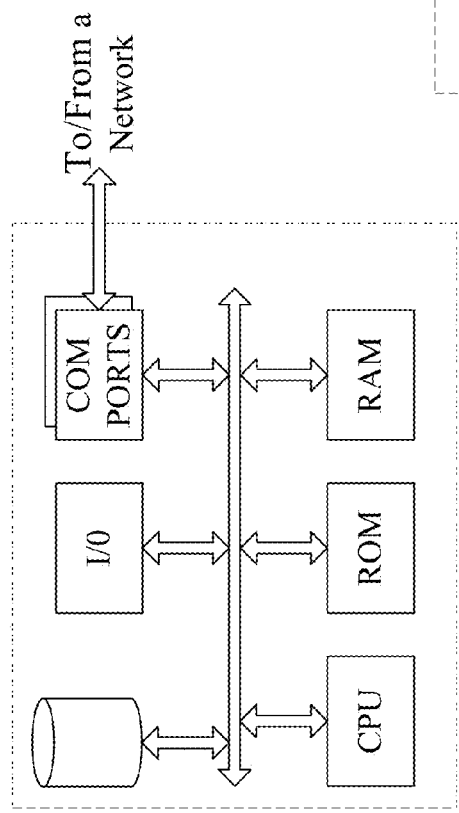
FIG. 4 is a simplified functional block diagram of a computer that may be configured to serve as a PGW server.
Figure 5:
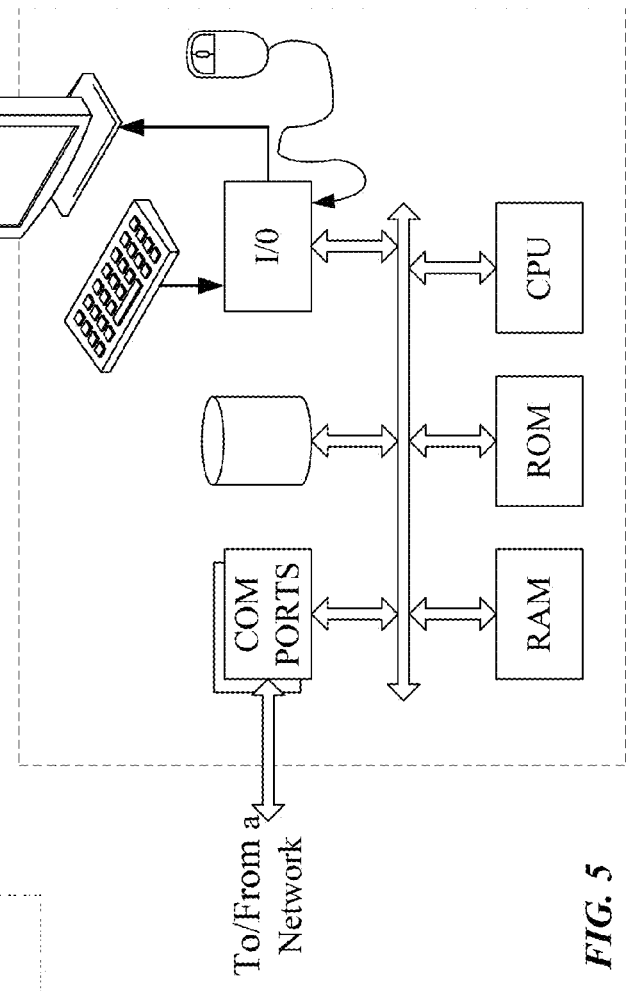
FIG. 5 is a simplified functional block diagram of a personal computer or other work station or terminal device, which may be configured to serve as a PGW server.

FIGS. 4 and 5 provide functional block diagram illustrations of general purpose computer hardware platforms. The computers illustrated in FIGS. 4 and 5 may correspond to the PGW 100 or the billing server. FIG. 4 is a simplified functional block diagram of a computer. FIG. 5 is a simplified functional block diagram of a personal computer or other work station or terminal device, although the computer of FIG. 5 may also act as a server if appropriately programmed. It is believed that the general structure and general operation of such equipment as shown in FIGS. 4 and 5 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface, CPU, main memory and one or more mass storage devices for storing user data and the various executable programs (see FIGS. 4 and 5). A mobile station type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, examples of the techniques for data throttling outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement instructions storing code corresponding to the steps 305-360 of the process 300 of FIGS. 3A-3B. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a Blu-ray disc read-only memory (BD-ROM), CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

These general and specific aspects may be implemented using a system, a method, a computer program, a computer readable medium, or an apparatus or any combination of systems, methods, computer programs, computer readable mediums, and/or apparatuses While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and may be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, should may they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   receiving, from a computing device subject to data throttling, a request to begin a data session on a network;
   responsive to receiving the request, allowing the computing device to access data via the network at a full network speed for a grace time period;
   upon expiration of the grace time period, allowing the computing device to access data via the network at a reduced network speed for a monitoring time period;
   during the monitoring time period, monitoring the computing device to determine whether the computing device is accessing data via the network in bursts or streaming data; and
   based on whether the computing device is accessing data via the network in bursts or streaming data, either (i) allowing the computing device to access data via the network at the full network speed for a throttling waiver time period or (ii) allowing the computing device to access data via the network at the reduced network speed until completion of the data session.

2. The method of claim 1, wherein based on whether the computing device is accessing data via the network in bursts or streaming data, either (i) allowing the computing device to access data via the network at the full network speed for the throttling waiver time period or (ii) allowing the computing device to access data via the network at the reduced network speed until completion of the data session comprises:
   upon determining that the computing device is accessing data via the network in bursts: allowing the computing device to access data via the network at the full network speed for the throttling waiver time period; and
   upon determining that the computing device is streaming data: allowing the computing device to access data via the network at the reduced network speed until completion of the data session.

3. The method of claim 2, further comprising:
   upon determining that the computing device is accessing data via the network in bursts:
   upon expiration of the throttling waiver time period, allowing the computing device to access data via the network at a reduced network speed for a second monitoring time period; and
   upon expiration of the second monitoring time period, allowing the computing device to access data via the network at the full network speed for a second throttling waiver time period.

4. The method of claim 3, wherein the second monitoring time period has a same duration as the monitoring time period, and the second throttling waiver time period has a same duration as the throttling waiver time period.

5. The method of claim 1, wherein monitoring the computing device to determine whether the computing device is accessing data via the network in bursts or streaming data comprises:
   determining, during the monitoring time period, a data drop rate of the computing device;
   if the data drop rate is above a data drop threshold: determining that the computing device is streaming data; and
   if the data drop rate is below the data drop threshold: determining that the computing device is accessing data in bursts.

6. The method of claim 5, wherein determining the data drop rate comprises:
   splitting the monitoring time period into a plurality of time increments, each time increment having a predetermined duration;
   determining an amount of data dropped in each time increment within the plurality of time increments;
   computing an average amount of data dropped per time increment; and
   determining the data drop rate based on the computed average amount of data dropped per time increment.

7. The method of claim 1, wherein the full network speed exceeds 1 megabit per second, and wherein the reduced network speed is below 500 kilobits per second.

8. The method of claim 1, further comprising:
   determining that the computing device is subject to data throttling based on an account associated with the computing device having accessed at least a threshold amount of data within a current billing cycle, and based on the account associated with the computing device having an unlimited data plan.

9. A non-transitory computer-readable medium comprising instructions which, when executed by a computer, cause the computer to:
   receive, from a computing device subject to data throttling, a request to begin a data session on a network;
   responsive to receiving the request, allow the computing device to access data via the network at a full network speed for a grace time period;
   upon expiration of the grace time period, allow the computing device to access data via the network at a reduced network speed for a monitoring time period;
   during the monitoring time period, monitor the computing device to determine whether the computing device is accessing data via the network in bursts or streaming data; and
   based on whether the computing device is accessing data via the network in bursts or streaming data, either (i) allow the computing device to access data via the network at the full network speed for a throttling waiver time period or (ii) allow the computing device to access data via the network at the reduced network speed until completion of the data session.

10. The computer-readable medium of claim 9, wherein the instructions to, based on whether the computing device is accessing data via the network in bursts or streaming data, either (i) allow the computing device to access data via the network at the full network speed for the throttling waiver time period or (ii) allow the computing device to access data via the network at the reduced network speed until completion of the data session comprise instructions which, when executed by the computer, cause the computer to:
   upon determining that the computing device is accessing data via the network in bursts: allow the computing device to access data via the network at the full network speed for the throttling waiver time period; and
   upon determining that the computing device is streaming data: allow the computing device to access data via the network at the reduced network speed until completion of the data session.

11. The computer-readable medium of claim 10, further comprising instructions which, when executed by the computer, cause the computer to:
  upon determining that the computing device is accessing data via the network in bursts:
  upon expiration of the throttling waiver time period, allow the computing device to access data via the network at a reduced network speed for a second monitoring time period; and
  upon expiration of the second monitoring time period, allow the computing device to access data via the network at the full network speed for a second throttling waiver time period.

12. The computer-readable medium of claim 11, wherein the second monitoring time period has a same duration as the monitoring time period, and the second throttling waiver time period has a same duration as the throttling waiver time period.

13. The computer-readable medium of claim 9, wherein the instructions to monitor the computing device to determine whether the computing device is accessing data via the network in bursts or streaming data comprise instructions which, when executed by the computer, cause the computer to:
  determine, during the monitoring time period, a data drop rate of the computing device;
  if the data drop rate is above a data drop threshold: determine that the computing device is streaming data; and
  if the data drop rate is below the data drop threshold: determine that the computing device is accessing data in bursts.

14. The computer-readable medium of claim 13, wherein the instructions to determine the data drop rate comprise instructions which, when executed by the computer, cause the computer to:
  split the monitoring time period into a plurality of time increments, each time increment having a predetermined duration;
  determine an amount of data dropped in each time increment within the plurality of time increments;
  compute an average amount of data dropped per time increment; and
  determine the data drop rate based on the computed average amount of data dropped per time increment.

15. The computer-readable medium of claim 9, wherein the full network speed exceeds 1 megabit per second, and wherein the reduced network speed is below 500 kilobits per second.

16. The computer-readable medium of claim 9, further comprising instructions which, when executed by the computer, cause the computer to:
  determining that the computing device is subject to data throttling based on an account associated with the computing device having accessed at least a threshold amount of data within a current billing cycle, and based on the account associated with the computing device having an unlimited data plan.

17. A system comprising:
  a processor; and
  a memory comprising instructions which, when executed by the processor, cause the processor to:
    receive, from a computing device subject to data throttling, a request to begin a data session on a network;
    responsive to receiving the request, allow the computing device to access data via the network at a full network speed for a grace time period;
    upon expiration of the grace time period, allow the computing device to access data via the network at a reduced network speed for a monitoring time period;
    during the monitoring time period, monitor the computing device to determine whether the computing device is accessing data via the network in bursts or streaming data; and
    based on whether the computing device is accessing data via the network in bursts or streaming data, either (i) allow the computing device to access data via the network at the full network speed for a throttling waiver time period or (ii) allow the computing device to access data via the network at the reduced network speed until completion of the data session.

18. The system of claim 17, wherein the instructions to, based on whether the computing device is accessing data via the network in bursts or streaming data, either (i) allow the computing device to access data via the network at the full network speed for the throttling waiver time period or (ii) allow the computing device to access data via the network at the reduced network speed until completion of the data session comprise instructions which, when executed by the processor, cause the processor to:
  upon determining that the computing device is accessing data via the network in bursts: allow the computing device to access data via the network at the full network speed for the throttling waiver time period; and
  upon determining that the computing device is streaming data: allow the computing device to access data via the network at the reduced network speed until completion of the data session.

19. The system of claim 18, the memory further comprising instructions which, when executed by the processor, cause the processor to:
  upon determining that the computing device is accessing data via the network in bursts:
  upon expiration of the throttling waiver time period, allow the computing device to access data via the network at a reduced network speed for a second monitoring time period; and
  upon expiration of the second monitoring time period, allow the computing device to access data via the network at the full network speed for a second throttling waiver time period.

20. The system of claim 19, wherein the second monitoring time period has a same duration as the monitoring time period, and the second throttling waiver time period has a same duration as the throttling waiver time period.

* * * * *